(12) United States Patent
Baumann et al.

(10) Patent No.: US 10,030,776 B2
(45) Date of Patent: Jul. 24, 2018

(54) SEALING DEVICE AND METHOD FOR SEALING IN A FLUID MEDIUM

(71) Applicant: Aktiebolaget SKF, Gothenburg (SE)

(72) Inventors: Michael Baumann, Aberdeenshire (GB); Christian Kogler, Oberkurzheim (AT); Wolfgang Swete, Knittelfeld (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/310,355

(22) PCT Filed: May 27, 2015

(86) PCT No.: PCT/EP2015/061646
§ 371 (c)(1),
(2) Date: Nov. 10, 2016

(87) PCT Pub. No.: WO2015/181204
PCT Pub. Date: Dec. 3, 2015

(65) Prior Publication Data
US 2017/0167614 A1     Jun. 15, 2017

(30) Foreign Application Priority Data

May 27, 2014   (DE) .................. 10 2014 210 129

(51) Int. Cl.
*F16J 15/32* (2016.01)
*F16J 15/3296* (2016.01)
(Continued)

(52) U.S. Cl.
CPC .......... *F16J 15/3296* (2013.01); *F03B 13/26* (2013.01); *F16J 15/004* (2013.01);
(Continued)

(58) Field of Classification Search
CPC ...... F16J 15/32; F16J 15/3204; F16J 15/3212; F16J 15/3216; F16J 15/3232
(Continued)

(56) References Cited

U.S. PATENT DOCUMENTS 3,413,008 A * 11/1968 Greiner .................. B63H 23/36
                                                277/505
4,448,425 A *  5/1984 von Bergen ......... B63H 23/321
                                                277/320
(Continued)

FOREIGN PATENT DOCUMENTS

DE          3718411 A1    12/1988
DE         10314923 A1    11/2004
(Continued)

*Primary Examiner* — Gilbert Y Lee
(74) *Attorney, Agent, or Firm* — Bryan Peckjian; SKF USA Inc. Patent Dept.

(57) ABSTRACT

A seal device for sealing in a liquid medium includes a first seal assembly disposed on a primary side facing the medium and configured to seal a stationary component with respect to a rotatable component, a second seal assembly disposed on a secondary side facing away from the medium and configured to seal the stationary component with respect to the rotatable component, and a sensor connected to a volume located between the first seal assembly and the second seal assembly and configured to detect a change of a moisture level in the volume. The stationary component further includes a bore located axially between a contact surface for the first seal assembly and a contact surface for the second seal assembly, and the volume is connected to a pressure tank by the bore.

15 Claims, 4 Drawing Sheets

(51) Int. Cl.
*F16J 15/00* (2006.01)
*F03B 13/26* (2006.01)

(52) U.S. Cl.
CPC ....... *F05B 2220/32* (2013.01); *F05B 2240/57* (2013.01); *F05B 2240/60* (2013.01)

(58) Field of Classification Search
USPC ........................................................ 277/320
See application file for complete search history.

(56) References Cited

U.S. PATENT DOCUMENTS

| | | | | |
|---|---|---|---|---|
| 4,984,811 A * | 1/1991 | Kuwabara | ............... | B63H 23/36 277/563 |
| 5,219,434 A * | 6/1993 | Von Bergen | ......... | F16J 15/3456 210/171 |
| 5,562,406 A | 10/1996 | Ooka et al. | | |
| 5,643,026 A | 7/1997 | Pietsch et al. | | |
| 6,481,720 B1 * | 11/2002 | Yoshida | ............... | B63H 23/321 277/400 |
| 6,514,108 B2 * | 2/2003 | von Bergen | ......... | B63H 23/321 440/112 |
| 7,086,275 B2 * | 8/2006 | Bock | .................... | F16J 15/3296 277/317 |
| 8,608,176 B2 * | 12/2013 | Bachhofner | ........... | F16J 15/004 277/512 |
| 9,404,582 B2 * | 8/2016 | Wrage | .................. | F16J 15/3232 |
| 2004/0232620 A1 * | 11/2004 | Bock | .................... | G01M 3/045 277/320 |
| 2011/0304102 A1 * | 12/2011 | Yoshida | ............... | B63H 23/321 277/549 |
| 2016/0341316 A1 * | 11/2016 | Baumann | ............. | F16J 15/3232 |

FOREIGN PATENT DOCUMENTS

| | | |
|---|---|---|
| DE | 102010008772 A1 | 8/2011 |
| DE | 102011016185 A1 | 10/2012 |
| EP | 1223359 A1 | 7/2002 |
| EP | 2272750 A2 | 1/2011 |
| WO | 2007124830 A1 | 11/2007 |
| WO | 2008120399 A1 | 10/2008 |

* cited by examiner

SEALING DEVICE AND METHOD FOR SEALING IN A FLUID MEDIUM

CROSS-REFERENCE

This application is the U.S. National Stage of International Application No. PCT/EP2015/061646 filed on May 27, 2015, which claims priority to German patent application no. 10 2014 210 129.8 filed on May 27, 2014.

TECHNOLOGICAL FIELD

The present invention is in the field of sealing in a liquid medium.

BACKGROUND

Seals are used in many areas of technology. These seals can provide, for example, a protection of a mechanical or electrical component from aggressive environmental media (for example, corrosive, caustic, or under-high-pressure materials). Under these conditions, however, the seals can be subjected to high loads and accordingly wear quickly. A seal on a movable component, e.g., a shaft seal, can also be subjected to a high load. Furthermore, shaft seals in underwater applications can be used where maintenance or their replacement can in some cases be expensive or only possible with difficulty, such as, for example, in turbines of current- or tidal-power plants. Such seal systems can potentially have high production- or acquisition-costs or high wear rates, or fail at a time at which the risk of damage by penetrated water is not or at least only partially preventable.

Conventional solutions comprise, for example, plastic-containing sealing systems for applications in shallow water, such as, for example, are used in the field of shipbuilding. However, in some cases such solutions can cause a too-short service life or too-high costs, for example, due to an expense of manufacturing materials or a complex manufacturing process.

It is therefore desirable to improve a compromise of maintenance expense, reliability, loadability, and manufacturing costs.

SUMMARY

A seal device for sealing in a liquid medium according to the disclosure addresses these requirements.

According to a first aspect, exemplary embodiments relate to a seal device for sealing in a liquid medium. The seal device comprises a first sealing assembly, which is disposed on a primary side facing the medium and seals a stationary component with respect to a rotatable component. The seal device also comprises a second sealing assembly, which is disposed on a secondary side facing away from the medium and seals the stationary component with respect to the rotatable component. The seal device further comprises a sensor, which is connected to a volume located between the first sealing assembly and the second sealing assembly and is configured to measure a change of a moisture. The stationary component further includes a bore located between a contact surface for the first sealing assembly and a contact surface for the second sealing assembly. Here the volume is connected to a pressure tank by the bore. A possibility can thereby be provided to detect wear on the sealing device early while a sealing function is also maintained. A point in time for maintenance can thus be established early. In addition, under certain circumstances an improved protection of the sensor can be achieved using the seal assemblies. In addition, a removing of a medium already penetrated into the volume can at least partially be made possible.

In some exemplary embodiments the first or the second seal assembly comprises a lip seal. The lip seal here has an axially extending indentation facing the medium. With pressure changes of the medium a penetrating thereof to a side of the lip seal facing away from the medium can thereby be made more difficult or possibly prevented.

In some exemplary embodiments the first or the second seal assembly comprises at least one additional lip seal. Here the additional lip seal includes an axially extending indentation facing away from the medium. A sealed volume between the lip seal and the additional lip seal can thereby be provided, which can be desirable, for example, with a filling with a lubricant.

In some exemplary embodiments the first or the second seal assembly comprises at least one further lip seal. Here the further lip seal receives a coil spring radially surrounding the rotatable component such that a center axis of the coil spring has a circular course with a larger radius than a course of a seal surface of the further lip seal. A contact pressure of the seal surface on the rotatable component can thus be increased, and therefore, under certain circumstances, a penetrating of materials in the axial direction and a counter-direction can be prevented. It can thus be possible, for example to prevent an escape of a lubricant, which is located in a volume at least partially delimited by the rotatable component and the first or second seal assembly, to a side of the seal assembly facing the medium.

In some exemplary embodiments the first sealing assembly further comprises a further sensor. Here the further sensor is disposed between the lip seal and the further lip seal or the additional lip seal. The further sensor is configured to measure a change of a moisture. With wear occurring on the first seal assembly it can thus be possible to establish a successive penetrating of the medium through the lip seal with the help of the further sensor and through the further or additional lip seal with the help of the sensor. It can thereby be made possible to determine precise information about progress of the wear.

In some exemplary embodiments the lip seal or the further lip seal are non-rotatably connected to the stationary component and are in sliding contact with the rotatable component. In some applications a wear surface can thereby be reduced.

In some exemplary embodiments the lip seal, the further lip seal, or the additional lip seal are exchangeably connected to the stationary or the rotatable component. A maintenance process can thus optionally be facilitated, or undesired damage to components during maintenance be avoided. In the event of wear only an affected lip seal can thereby be exchanged, and an exchange of further components or even the entire seal device can thereby be omitted.

In some exemplary embodiments the stationary component is a housing, and the rotatable component a shaft. Thus an application possibility can be given for permanently loaded components, such as, for example, a shaft.

In some exemplary embodiments the seal device further comprises a pressure sensor. The pressure sensor is disposed between the lip seal and the additional or further lip seal of the first seal assembly, and configured to measure a pressure change in a volume between the lip seal and the additional or further lip seal. A penetrating of larger leakage amounts of the medium can thus be determined in a simpler manner.

In some exemplary embodiments the seal device further comprises a filling level gauge. The filling level gauge is disposed in the pressure tank and configured to measure an amount of substance of the medium located in the pressure tank. A redundant system can thereby be provided in order to also detect smaller leakage amounts.

Some exemplary embodiments further relate to an underwater turbine with a seal device for sealing a shaft of the underwater turbine with respect to seawater. The seal device comprises a first seal assembly, which is disposed on a primary side facing the seawater and seals a stationary component with respect to the shaft. The seal device also comprises a second seal device, which is disposed on the secondary side facing away from the seawater and seals the stationary component with respect to the shaft. The seal device also comprises a sensor, which is connected to a volume located between the first seal assembly and the second seal assembly and is configured to measure a change of a moisture. Thus a use possibility can be given in an environment generating increased wear.

Some exemplary embodiments further relate to a tidal power plant with an underwater turbine with a seal device for sealing a shaft of the underwater turbine with respect to seawater. Thus a use possibility can be given with an increased or highly varying static or dynamic pressure of the medium.

According to a further aspect exemplary embodiments relate to a method for sealing in a liquid medium. The method comprises a sealing of a stationary component with respect to a rotatable component using a first seal assembly. The method also comprises a sealing of a stationary component with respect to a rotatable component using a second seal assembly. The method further comprises a measuring of a change of a moisture between the first and the second seal assembly. The method further comprises a generating of a measurement signal when the change comprises an increase by at least a predetermined threshold value. This can make possible a use of measurement signals with information about wear, for example, by a system for monitoring an operating state or to repair a water entry.

Further advantageous designs are described in more detail below with reference to exemplary embodiments depicted in the Figures, but are not limited to said exemplary embodiments.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1A:
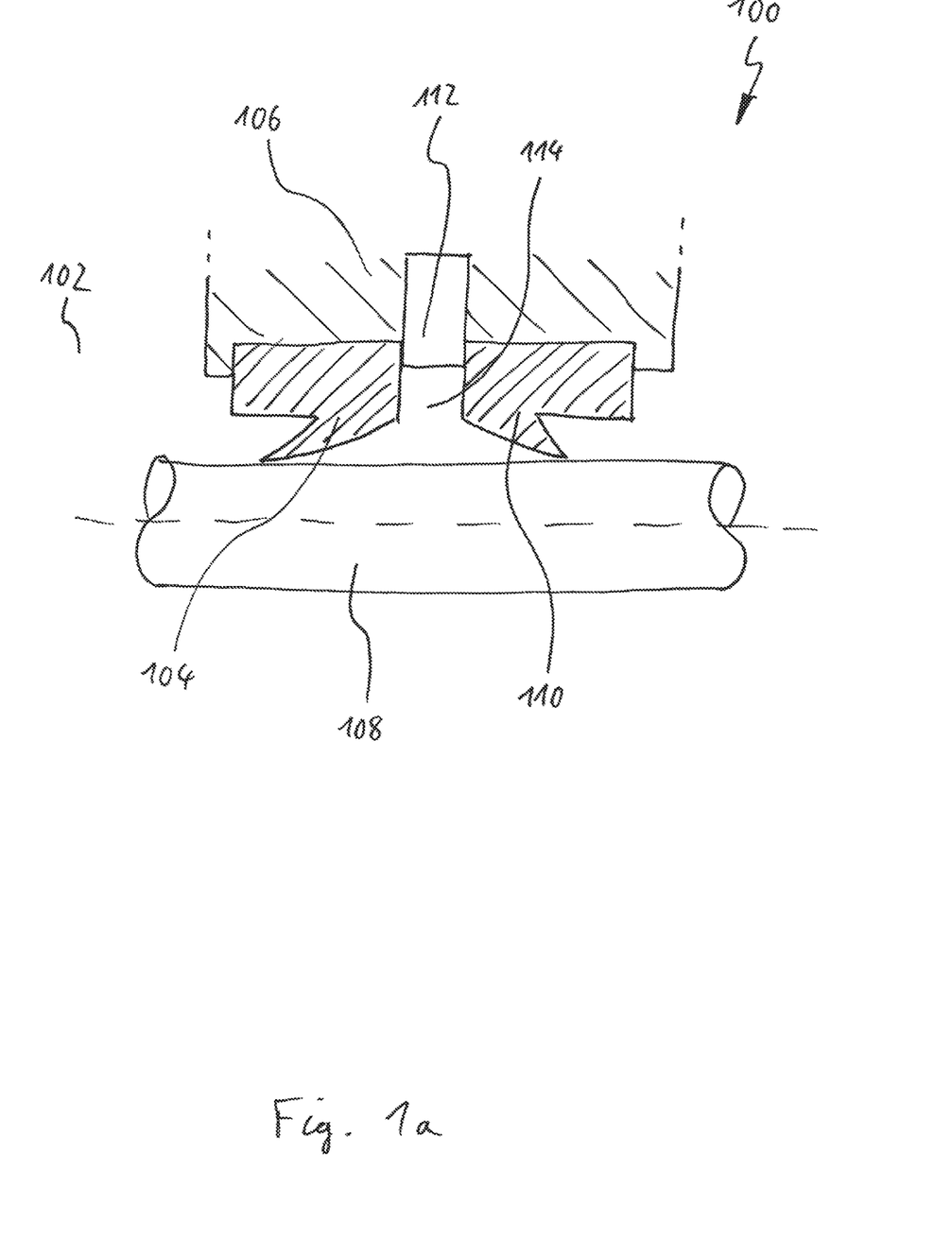
FIG. 1a shows in detail a cross-sectional view of a seal device for sealing in a liquid medium according to a simple exemplary embodiment.

FIG. 1a shows a seal device 100 for sealing in a liquid medium 102 according to a simple exemplary embodiment. The seal device 100 comprises a first seal assembly 104, which is disposed on a primary side facing the medium 102 and seals a stationary component 106 with respect to a rotatable component 108. The seal device 100 also comprises a second seal assembly 110, which is disposed on a secondary side facing away from the medium 102 and seals the stationary component 106 with respect to the rotatable component 108. The seal device 100 further comprises a sensor 112, which is connected to a volume 114 located between the first seal assembly 104 and the second seal assembly 110 and is configured to measure a change of a moisture. A possibility can thereby be provided to detect wear on the seal device 100 early while a sealing function is also maintained. A point in time for maintenance can thus be established early.

The term "primary side" refers to a side facing the medium 102. The term "secondary side" refers to a side facing away from the medium 102. Both terms can be used in relation to each other but also in relation to a component. For example, a primary side of the first seal assembly 104 refers to a side of the first seal assembly 104 facing the medium 102. Furthermore, terms mentioned can also be used attributively, i.e., for example, "primary-side."

The first or second seal assembly 104; 110 can be manufactured one-part or multi-part. Furthermore, the first or second seal assembly 104; 110 can each be or include a lip seal, or also each include a plurality of lip seals. The first or second seal assembly 104; 110 can be manufactured from a seal material. A seal material can be, for example, a plastic, (e.g. polyurethane, nitrile rubber (NBR), hydrated nitrile butadiene rubber (HNBR)), depending on which type of material is to be hindered from penetrating or escaping. The seal can be manufactured at least partially from metal, metal alloys, particularly low-friction plastics such as, e.g., polytetrafluoroethylene (PTFE), or plastics having high stiffness. Plastics of high stiffness can be so-called duroplasts. In addition, the seal can be manufactured at least partially from rubber-type materials or from plastics of low stiffness; these can be, for example, elastomers or thermoplastics. A seal effect can thereby be increased and wear on the rotatable component 108 reduced. Some of the materials mentioned can also reduce friction or have a higher resistance in salt water in comparison to conventional materials.

The liquid medium 102 can comprise, for example, fresh water, salt water, or brackish water. The sensor 112 can be, for example, a magnetoelastic resonance sensor (MER sensor), or comprise such a sensor, which is configured to measure an electrical conductivity of an environment, which conductivity has changed due to a moisture change. In a further exemplary embodiment the sensor is configured to measure a viscosity, acceleration, vibration, temperature, material concentration, or a pressure. The sensor can be connected, for example, in an interference-fit, friction-fit, or material-bonded manner to the first or second seal assembly 104; 110 or the fixed component 106, or also at least partially enclosed by a material of the first or second seal assembly 104; 110. The fixed component 106 can be a housing 106, for example. The rotatable component 108 can be, for example, an axle or a shaft 108. The shaft 108 can also include a coating on a contact surface for the first or second seal assembly 104; 110, which contact surface has a lower coefficient of friction than a material from which the shaft 108 is manufactured. The coating can comprise Teflon, for example. Furthermore, the shaft can be manufactured at least partially from a hardened material, e.g., in a region of the contact surface. Wear on the first or second seal assembly 104; 110 or the shaft 108 can thereby be reduced.

The medium 102 can have a pressure that exceeds a counterpressure on a secondary side of the first seal assembly 104. The pressure here can be static or dynamic and also subject to alternatingly strong fluctuations. Wear on the first seal assembly 104 can thereby be greater than on the second seal assembly 110. If a sealing effect of the first seal assembly 104 decreases due to the wear, the medium can penetrate into the volume 114, but is prevented from a further penetrating by the second seal assembly 110. The sensor 112 here detects an increase of the moisture in the volume 114. In some exemplary embodiments the sensor 112 generates a measurement signal or a warning signal when the change of the moisture comprises an increase by at least a predetermined threshold value. It can thereby be made possible to detect a progressing wear of the seal device 100 before the medium 102 penetrates onto a secondary side of the seal device 100, or, more specifically, penetrates the second seal assembly 110. It can thus be made possible to avoid damage to components located secondary-side of the seal device 100, for example, electrical or electronic components. With simultaneous maintaining of a seal effect of the seal device 100 wear can thereby possibly be detected and repaired.

Figure 1B:
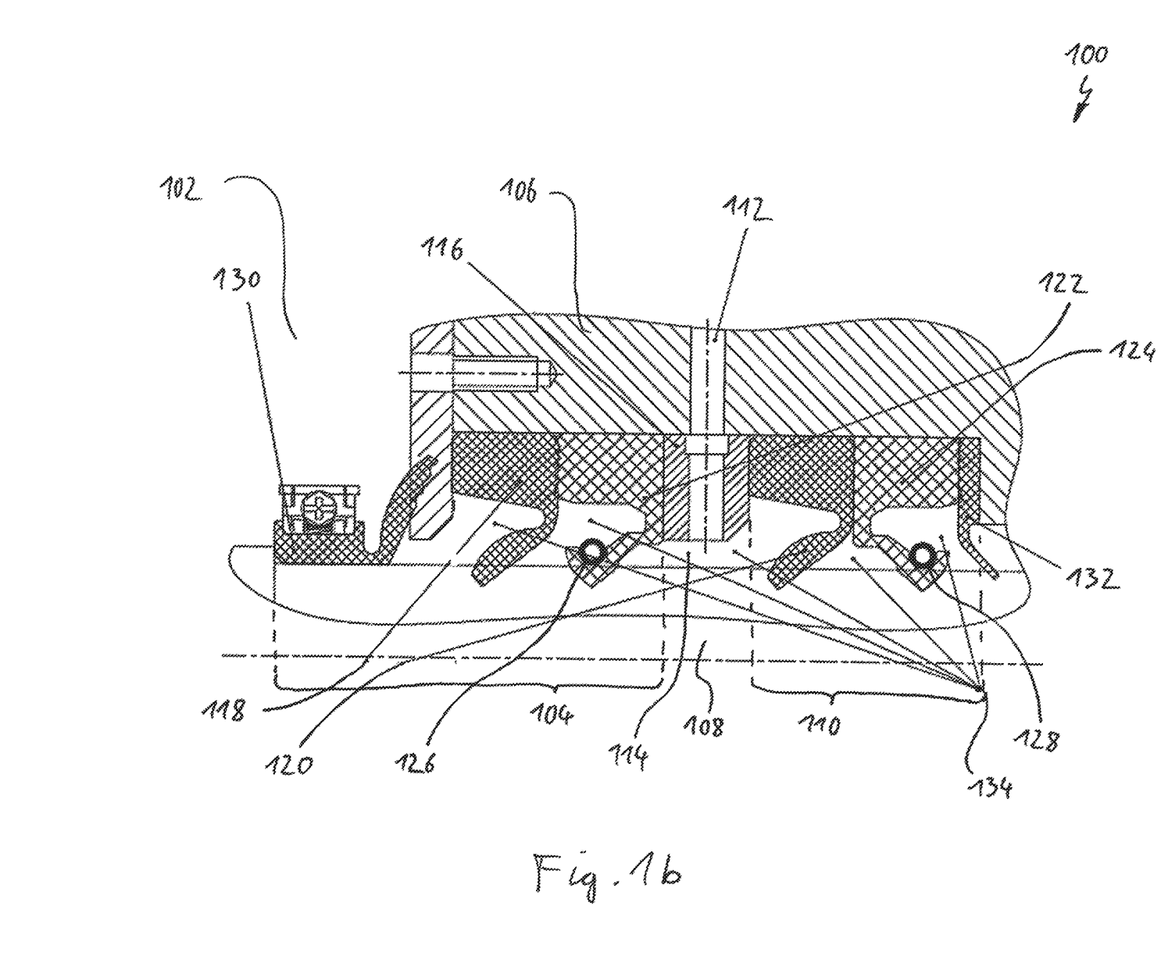
FIG. 1b shows in detail a cross-sectional view of a seal device for sealing in a liquid medium according to a detailed exemplary embodiment.

A further detailed exemplary embodiment is shown in FIG. 1b. Components that have an equivalent in FIG. 1a are referred to herein with identical reference numbers. The same components are not explained again in the following, rather only the differences to FIG. 1a are dealt with.

A spacer 116 is introduced between the first seal assembly 104 and the second seal assembly 110, which spacer is in abutment with the seal assemblies 104; 110 in the axial direction. The spacer 116 further comprises at least one opening, which serves, for example, for receiving the sensor 112. Here the sensor 112 can, as shown in FIG. 1b, be at least partially introduced into the opening. The sensor 112 can also be at least partially introduced into a further opening on the housing 106, which continues a course of the opening in the spacer 116. Furthermore, the sensor 112 can be connected to the volume 114 by the opening or the further opening.

The first seal assembly 104 comprises a first lip seal 118. The second seal assembly 110 comprises a second lip seal 120. The first and the second lip seal 118; 120 here have an axially extending indentation facing the medium 102. If a higher pressure prevails on the primary side of the lip seal 118; 120 than the secondary side, a penetrating of a primary-side material, e.g., the medium 102, onto the secondary side can be made more difficult or possibly prevented. In some exemplary embodiments a primary-side pressure can be higher by up to 2, 5, or 10 bar than a secondary-side pressure.

The first seal assembly further comprises a further lip seal, which in the following is referred to as first spring-reinforced lip seal 122. The second seal assembly 110 further comprises a further lip seal, which in the following is referred to as second spring-reinforced lip seal 122. Here the first spring-reinforced lip seal 122 receives a first coil spring 126 radially enclosing the rotatable component, and the second spring-reinforced lip seal 122 receives a second coil spring, such that a center axis of the first or second coil spring 126; 128 has a circular course with a larger radius than a course of a seal surface of the first or second spring-reinforced lip seal 122; 124. A contact pressure of the seal surface on the rotatable component can thus be increased. A penetrating of a material both from the primary- to the secondary-side and from the secondary- to the primary-side of the first or second spring-reinforced lip seal 122; 124 can thus be made more difficult or prevented. This can be desirable in order to, for example, hold the medium on the primary side and simultaneously a lubricant on the secondary side. Furthermore a constant force transmission can be effected by the first or second coil spring 126; 128, and a continuous contact to the shaft 108 can thereby be provided. Thus the first or second spring-reinforced lip seal 122; 124 can possibly maintain a seal effect, e.g., with respect water located primary-side or air located secondary-side, even with undesired slippage or incorrect positioning.

In some exemplary embodiments the first or the second seal assembly 104; 110 comprises at least one additional lip seal. For example, in FIG. 1b the first seal assembly 104 comprises a front lip seal 130, and the second seal assembly 110 a rear lip seal 132. The front and the rear lip seal 130; 132 here each include an axially extending indentation facing away from the medium. In other words, the front lip seal 130 is connected to the shaft 108 such that they rotate together, and is in sliding contact with the housing 106. Due to the front lip seal 130 a sealing can be achieved with respect to suddenly occurring pressure surges or with respect to contamination by dirt particles or suspended particles. The rear lip seal 132 is non-rotatably connected to the housing 106 and is in sliding contact with the shaft 108. The rear lip seal 132 can, for example, prevent lubricant located primary-side from a leakage onto the secondary side or also impede a slipping of the second coil spring 128 in the axial direction in the event of a possible failure of the second spring-reinforced lip seal 124. Furthermore, the rear lip seal 132 can possibly maintain a seal effect with the occurrence of pressure surges.

In the following the front lip seal 130, the first lip seal 118, the first spring-reinforced lip seal 122, the second lip seal 120, the second spring-reinforced lip seal 124, and the rear lip seal 132 are summarized under the heading "seals." Furthermore a plurality of volumes 134 is formed between each two adjacent seals in the just-mentioned sequence, which in FIG. 1b also comprises the volume 114. The plurality of volumes 134 can additionally be filled with a lubricant.

If a dynamic or static pressure acts through the medium 102, under certain circumstances the seal located farthest away primary-side (e.g., in FIG. 1b the front lip seal 130) can be subject to a relatively stronger load than a seal situated secondary-side, and thereby possibly wear faster, which in turn can cause a loss of the seal effect. With loss of the seal effect of a seal the load can be transmitted by the pressure of the medium 102 onto the seal directly following on the secondary side. In FIG. 1b in this case the first lip seal 118 experiences said load from now on. In other words a wear-related failure of seals and a penetrating of the medium 102 associated therewith can possibly occur only gradually in the secondary-side direction. Any damage due to an escape of, e.g., water onto the secondary side of the seal device 100 can thus be delayed, and a maintenance before an emergence of damage can thereby be significantly facilitated. Thus under certain circumstances, for example, an exchanging of a seal can be scheduled. Furthermore, for example, a penetrating of water through a secondary-side seal can furthermore be made more difficult or prevented while an exchange is performed of a primary-side seal damaged by wear.

If wear on the front lip seal 130, the first lips seal 118, and the first spring-reinforced lip seal 122 has progressed such that the medium 102, e.g., water, penetrates into the volume 114, an increase of the moisture or a continuous water inflow is measured by the sensor. In one exemplary embodiment the sensor provides a signal, for example, to an operator of a tidal power plant with an underwater turbine comprising the seal device 100. The signal can comprise information about a required maintenance.

The previously defined seals can each be interchangeably connected to the housing 106 or the shaft 108. This means, in other words, multiply connectable or removable, repeatedly connectable or removable, or connectable or removable in a damage-free manner. Maintenance can thus be made easier. Furthermore a throughput of material can thereby be reduced, which can effect a saving of additional costs.

In some exemplary embodiments the housing 106 further includes a bore located between a contact surface for the first seal assembly 104 and a contact surface for the second seal assembly 110. Here the volume 114 is connected by the bore to a pressure tank. A removing of a medium already penetrated into the volume can thereby at least partially be made possible. In other words, a system for repairing a leakage (English: leakage recovery system) can thereby be connected to the volume, which is explained in more detail below with reference to two exemplary embodiments.

In a first exemplary embodiment the pressure tank is, for example, located in a nacelle of a tidal turbine, which is connected to a compressed air source, for example, a compressed air bottle. A predefined pressure can be set in the tank and thus in the volume 114 via a compressed-air control valve. In the exemplary case of a nacelle depth of 30 m under a water surface, with an external pressure of the surrounding water of 3 bar, an ideal value of the pressure in the tank is also predefined at 3 bar, which is set at the compressed air source. Penetrated leakage water is also received by the tank. The leakage water is optionally pumped with a pump system, for example, back into the sea, in the event of an exceeding of a predefined minimum pressure. For example, the sensor 112 can measure the pressure in this case.

In a second exemplary embodiment the pressure is itself applied in the seal system by an external pressure of, for example, seawater, so that a use of a compressed air source can possibly be omitted. For this purpose the pressure tank is connected via a connection to a water tank or a water line. The water tank or the water line is also connected to the seawater via a further connection. Here, for example, the seal device can be under water, or surrounding water can be separated from air located in the volume 114 by a pressure control valve.

In further exemplary embodiments the first seal assembly 104 further comprises at least one further sensor. Here the further sensor is disposed between the lip seal 118 and the spring-reinforced lip seal 124 or the front lip seal 130. In another exemplary embodiment a further sensor is disposed on a primary side of the spring-reinforced lip seal 124, and a second further sensor on a secondary side of the spring-reinforced lip seal 124. The further sensor is configured to measure a change of a moisture. In other words the further sensor may be connected to a volume partially enclosed by the front lip seal 130 and the lip seal 118, or by the lip seal 118 and the spring-reinforced lip seal 124, and measure, for example, a water ingress in this volume. When the change of the moisture exceeds a predefined threshold value the further sensor can provide a signal. Thus information for the user can be made more precise via a progress of the wear state of the seal device 100. It can thus, for example, be pre-calculated when a penetrating of water onto the secondary side of the seal device 100 is estimated to be expected, and a prior maintenance is optionally carried out.

Figure 2:
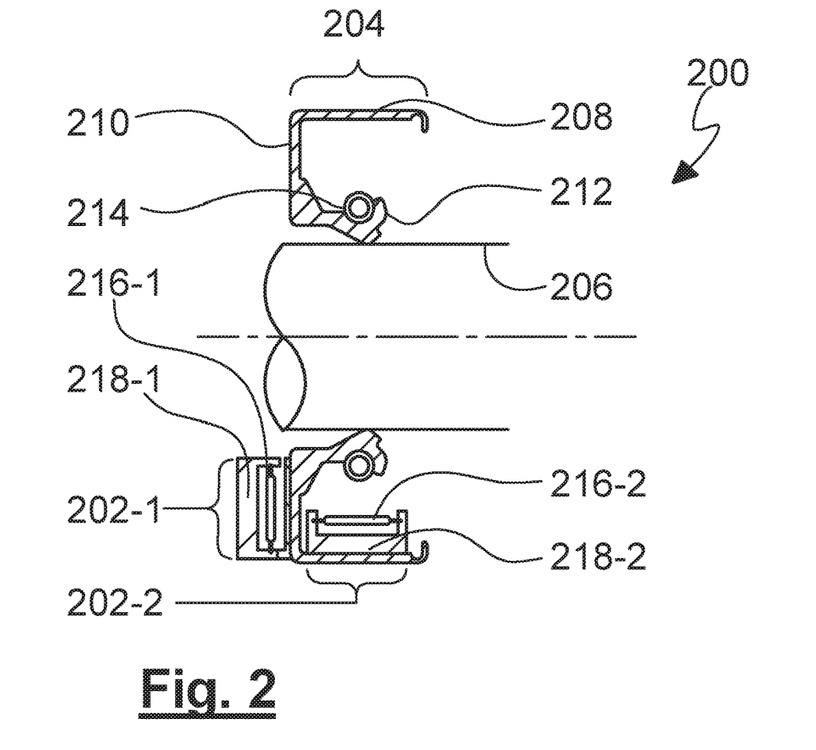
FIG. 2 shows in detail a possibility for disposing a sensor on a lip seal.
Figure 3:
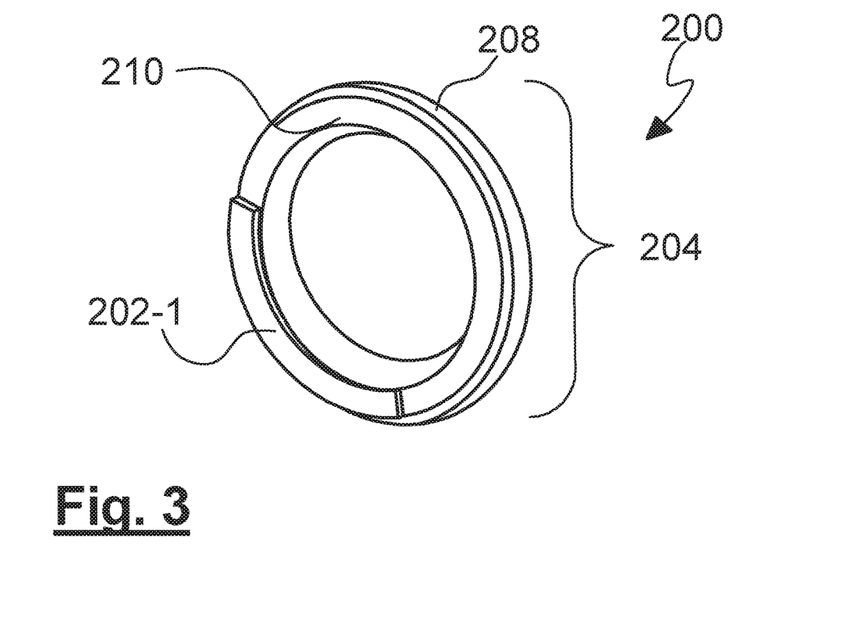
FIG. 3 shows in detail a perspective view of a possibility for disposing a sensor on a lip seal.

FIGS. 2 and 3 show a possibility for disposing a further sensor 202-1; 202-2 on a seal 200 in cross-section (FIG. 2) and in perspective view (FIG. 3). A penetrating, for example, of the medium 102 (compare FIG. 1*a*) or a property of an environment, e.g., air or lubricant, can be determined by the further sensor 202-1; 202-2. A measured value measurable from the further sensor 202-1; 202-2 comprises, for example, an electrical quantity changeable by moisture, or also a temperature, a viscosity, a material concentration, an acceleration or vibration or a pressure. The further sensor 201-1; 202-2 can be, for example, an MER sensor 202-1; 202-2 as depicted in FIG. 2. A magnetoelastic strip 216-1; 216-2 of the MER sensor 202-1; 202-2 can change its dimensions here when it is exposed to a magnetic field. The magnetic field can be generated, for example, by an electromagnet or also by a permanent magnet 218-1; 218-2. The strip 216-1; 216-2 can thus act as a magnetomechanical resonator. If the strip 216-1; 216-2 is exposed to a short magnetic pulse the strip 216-1; 216-2 can thereby be set into vibration. A frequency, amplitude, or attenuation of the vibration can allow a conclusion about a state of the strip 216-1; 216-2, for example whether a moisture absorbed by a material of the strip 216-1; 216-2 has changed.

The seal 200 comprises a seal ring 204, which in FIG. 2 is shown in the installed state and is in sliding contact with a shaft 206. The seal ring includes an axially and cylindrically extending outer surface 208, a radially extending end surface 210, and a lip 212 establishing the contact with the shaft 206. A coil spring 214 is introduced into the lip 212 such as already described in connection with the first and second spring-reinforced lip seal 122; 124 in FIG. 1*b*. In FIGS. 2 and 3 an MER sensor 202-1 is attached onto the end surface 210 on one side of the seal ring 204. On an opposite side of the seal ring 204 an MER sensor 202-2 is attached onto the outer surface 208 such that the MER sensor 202-2 is facing the shaft 206. In some exemplary embodiments the further sensor 202-1; 202-2 is attached to the seal ring 204 in an interference-fit, friction-fit, or material-bonded manner. In further exemplary embodiments the further sensor 202-1; 202-2 is at least partially enclosed by a material of the seal ring. A measuring of a moisture change can be effected on the primary side of the seal ring 204 and alternatively or additionally on the secondary side of the seal ring 204. In addition, the MER sensor 202-1 and the MER sensor 202-2 can each be configured to measure different measured values. Thus, for example, the MER sensor 202-1 can measure a change of the moisture, and the MER sensor 202-2 a temperature or viscosity (e.g., of a lubricant).

In some exemplary embodiments the seal device further comprises a pressure sensor. The pressure sensor can be disposed, for example, between the lip seal and the additional or further lip seal of the first seal assembly, and be configured to measure a pressure change in a volume between the lip seal and the additional or further lip seal. Furthermore a fill-level measuring device can be comprised by the seal device. The fill-level measuring device can be disposed, for example, in the pressure tank and be configured to measure a material quantity of the medium, which material quantity is located in the pressure tank. It can thus be made possible to provide a multi-level warning system for the detecting of leakages.

Here the fill-level measuring device can function as a first warning level with a penetrating of the medium, e.g., leakage water. This can detect smaller leakage amounts in comparison to the pressure sensor, for example, in the milliliter range, and if required provide a warning signal to a system operator.

The pressure sensor can be placed, for example, directly after a lip seal that is in contact with the medium, or, in other words, separated from the medium only by a lip seal. Here the pressure sensor can measure pressure changes, which can occur with leakage water amounts starting from a predefined minimum threshold.

The predefined minimum limit can be defined such that a corresponding leakage water amount in a prescribed intermediate space between two lip seals is required to change the pressure in this intermediate space in a measurable manner or over a prescribed minimum period of time.

This can provide a warning capability for improved detection of damage or signs of wear of the seal system that can possibly indicate an impending failure. A system operator can thereby be notified of a given need to replace the system in this case. Up to an actual exchange process one or more lip seals of the second seal assembly of the seal device can provide a further sealing effect, and thus an emergency running property. Furthermore the pressure sensor can represent a redundant monitoring system for the fill-level measuring device.

The moisture sensor can furthermore be disposed, for example, between the lip seal and the additional or further lip seal of the first seal assembly. The moisture sensor here can detect a failure or a flooding of the volume nearest the medium, which volume is delimited by lip seals. The sensor can also represent a redundant detector system in combination with the pressure sensor and the fill-level measuring device.

Figure 4:
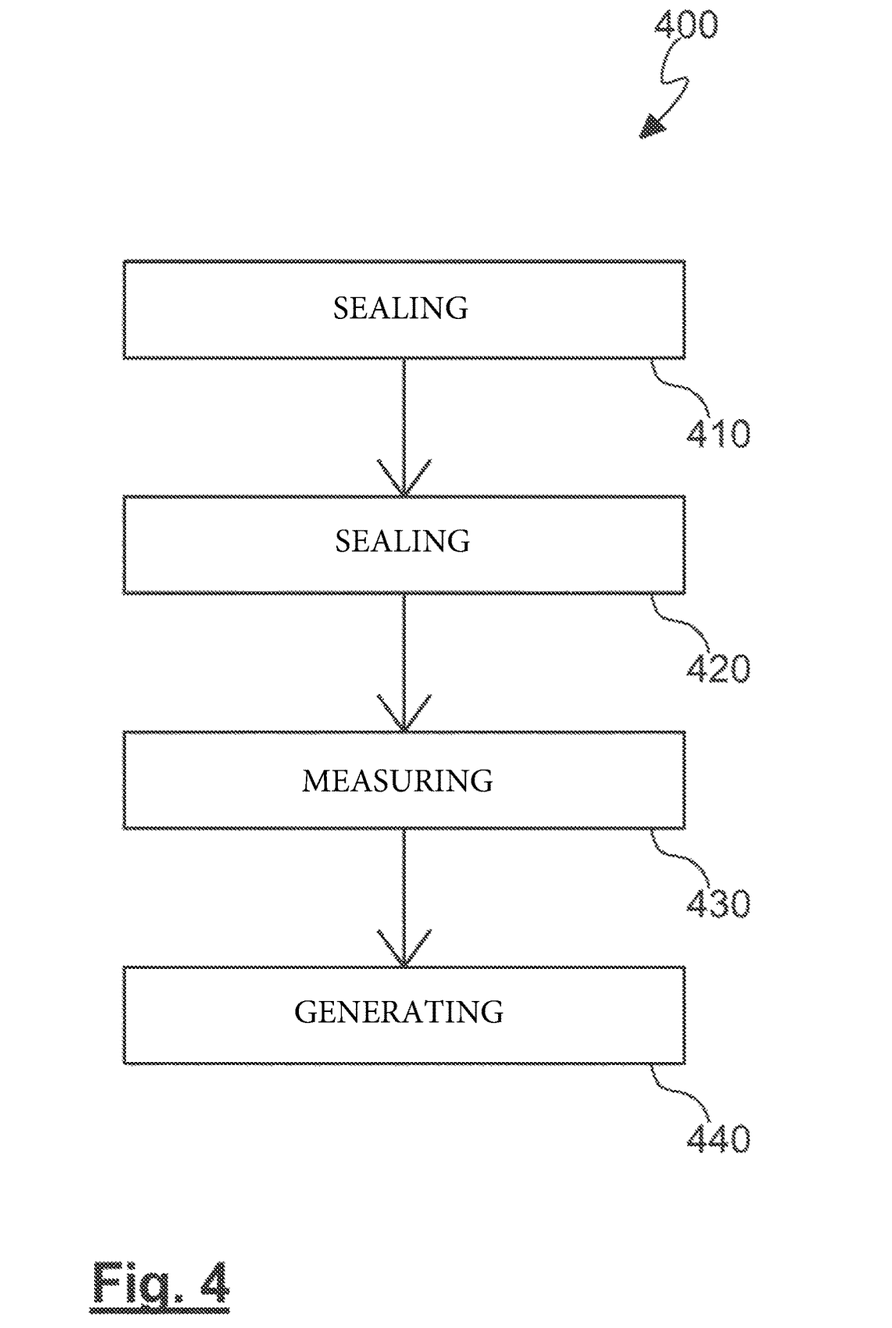
FIG. 4 shows a flow diagram of a method for sealing in a liquid medium according to an exemplary embodiment.

FIG. 4 shows a flow diagram for the sequence of a method 400 for sealing in a liquid medium. The method 400 comprises a sealing 410 of a stationary component with respect to a rotatable component using a first seal assembly. The method 400 also comprises a sealing 420 of a stationary component with respect to a rotatable component using a second seal assembly. The method 400 further comprises a measuring 430 of a change of a moisture between the first and the second seal assembly. The method 400 further comprises a generating 440 of a measurement signal when the change comprises an increase by at least one predetermined threshold value. This can make possible a using of measurement signals with information about wear, for example, by a system for monitoring an operating state or to fix a water entry.

Exemplary embodiments can be used, for example, in underwater applications, such as, for example, in turbines in tidal power plants, and possibly have there an improved resistance to stresses with respect to conventional solutions. Stresses can comprise corrosion, for example, by fresh- or salt-water, static pressure, or a dynamic pressure occurring at a predefined water depth (caused by kinetic energy, for example, wave movement, storm, current). In some exemplary embodiments the lip seals comprised by the first or second seal assembly can be individually adapted to an area of application or a requirement of a user or operator, which can make possible a flexible use. Some exemplary embodiments can effect a reduction of required installation space, increase due to redundancy (e.g., multiple available lip seals or sensors) a protection against a penetrating of a medium, make possible an early warning in the event of wear, simplify or accelerate a maintenance process, or effect a saving of costs. Some exemplary embodiments can be used in shallow water, or in other words maintain a seal effect with a pressure of up to 3.5 bar, 5 bar, or 10 bar. Furthermore, some exemplary embodiments can be connected, wirelessly or in a wired manner, to a monitoring system for monitoring an operating state of the seal device.

The features disclosed in the foregoing description, the following claims, and the accompanying Figures can be meaningful and can be implemented both individually as well as in any combination for the realization of an exemplary embodiment in its various embodiments.

REFERENCE NUMBER LIST

100 Seal device
102 Medium
104 First seal assembly
106 Fixed component
108 Rotatable component
110 Second seal assembly
112 Sensor
114 Volume
116 Spacer
118 Lip seal
120 Lip seal
122 Further lip seal
124 Further lip seal
126 Coil spring
128 Coil spring
130 Additional lip seal
132 Additional lip seal
134 Plurality of volumes
200 Seal
201-1; 202-2 MER sensor
204 Seal ring
206 Shaft
208 Outer surface
210 End surface
212 Lip
214 Coil spring
216-1; 216-2 Magnetoelastic strip
218-1; 218-2 Magnet
400 Method
410 Sealing
420 Sealing
430 Measuring
440 Generating

The invention claimed is:

1. A seal device for sealing in a liquid medium, comprising:
 a first seal assembly disposed on a primary side facing the medium and configured to seal a stationary component with respect to a rotatable component, the first seal assembly comprising at least two lip seals directly touching the rotatable component;
 a front lip seal attached to the rotatable component, disposed on an outer edge of the first seal assembly on the primary side facing the medium, and configured to seal the rotatable component with respect to the stationary component;
 a second seal assembly disposed on a secondary side facing away from the medium and configured to seal the stationary component with respect to the rotatable component;

a sensor connected to a volume located between the first seal assembly and the second seal assembly and configured to detect a change of a moisture level in the volume, wherein the stationary component further includes a bore located axially between a contact surface for the first seal assembly and a contact surface for the second seal assembly, wherein the volume is connected to a pressure tank by the bore.

2. The seal device according to claim 1, wherein the first seal assembly or the second seal assembly comprises a lip seal having an axially extending indentation facing the medium.

3. The seal device according to claim 2, wherein the first seal assembly or the second seal assembly comprises at least one additional lip seal having an axially extending indentation facing away from the medium.

4. The seal device according to claim 3, wherein the first seal assembly or the second seal assembly comprises at least one further lip seal configured to receive a coil spring radially enclosing the rotatable component such that a center axis of the coil spring has a circular course with a larger radius than a course of a seal surface of the further lip seal.

5. The seal device according to claim 4, wherein the lip seal, the further lip seal, or the additional lip seal are exchangeably connected to the stationary component or to the rotatable component.

6. The seal device according to claim 1, wherein the first seal assembly further comprises a further sensor disposed between the at least two lip seals, and wherein the further sensor is configured to detect a change of a moisture level.

7. The seal device according to claim 1, wherein the stationary component is a housing, and the rotatable component is a shaft.

8. The seal device according to claim 1, wherein the sensor is configured to generate a measurement signal when the change of the moisture level comprises an increase in the moisture level by at least one predetermined threshold value.

9. The seal device according to claim 1, further comprising:
a rear lip seal attached to the stationary component, disposed on an outer edge of the second seal assembly on the secondary side facing away from the medium, and configured to seal the stationary component with respect to the rotatable component.

10. An underwater turbine with a seal device for sealing a shaft of the underwater turbine with respect to seawater,
wherein the seal device comprises a first seal assembly disposed on a primary side facing the seawater and configured to seal a stationary component with respect to the shaft, the first seal assembly comprising at least two lip seals directly touching the shaft;
wherein the seal device comprises a front lip seal attached to the shaft, disposed on an outer edge of the first seal assembly on a primary side facing the seawater, and configured to seal the shaft with respect to the stationary component;
wherein the seal device comprises a second seal assembly disposed on a secondary side facing away from the seawater and configured to seal the stationary component with respect to the shaft; and
wherein the seal device comprises a sensor connected to a volume located axially between the first seal assembly and the second seal assembly, the sensor being configured to detect a change of a moisture level.

11. The underwater turbine according to claim 10, wherein the seal device includes a pressure tank connected to the volume by a bore.

12. The underwater turbine according to claim 10, wherein the sensor is configured to generate a measurement signal when the change of the moisture level comprises an increase in the moisture level by at least one predetermined threshold value.

13. The turbine of claim 10, further comprising:
a rear lip seal attached to the stationary component, disposed on an outer edge of the second seal assembly on the secondary side facing away from the seawater, and configured to seal the stationary component with respect to the shaft.

14. A method for sealing in a liquid medium, comprising:
sealing a stationary component with respect to a rotatable component using a first seal assembly, wherein the first seal assembly comprises at least two lip seals directly touching the rotatable component;
sealing a stationary component with respect to the rotatable component using a second seal assembly;
detecting a change of a moisture level in a space located axially between the first seal assembly and the second seal assembly; and
generating a measurement signal when the change comprises an increase by at least one predetermined threshold value.

15. The method according to claim 14, including connecting the space to a pressure tank via a bore.

* * * * *